(12) United States Patent
Sharma et al.

(10) Patent No.: US 12,470,493 B2
(45) Date of Patent: *Nov. 11, 2025

(54) NETWORK ENTITY AND USER EQUIPMENT FOR TRANSMISSION RATE CONTROL

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,349

(22) Filed: Feb. 16, 2024

(65) Prior Publication Data

US 2024/0195745 A1    Jun. 13, 2024

Related U.S. Application Data

(63) Continuation of application No. 17/785,065, filed as application No. PCT/EP2021/050833 on Jan. 15, 2021, now Pat. No. 11,916,797.

(30) Foreign Application Priority Data

Jan. 20, 2020    (EP) .................................... 20152728

(51) Int. Cl.
*H04L 47/25*    (2022.01)
*H04L 41/147*    (2022.01)
(Continued)

(52) U.S. Cl.
CPC ............ *H04L 47/25* (2013.01); *H04L 41/147* (2013.01); *H04L 47/127* (2013.01); *H04L 41/16* (2013.01)

(58) Field of Classification Search
CPC ....... H04L 47/00; H04L 47/127; H04L 47/25; H04L 47/26; H04L 47/263; H04L 41/14; (Continued)

(56) References Cited

U.S. PATENT DOCUMENTS 6,922,390 B1    7/2005    Chapman et al.
9,954,789 B2 *  4/2018    Basu Mallick ......... H04L 47/32
(Continued)

FOREIGN PATENT DOCUMENTS

CN    2018/092257    *  6/2018
CN    111919423 A       11/2020
(Continued)

OTHER PUBLICATIONS

International Search Report and Written Opinion mailed on Jun. 11, 2021, received for PCT Application PCT/EP2021/050833, filed on Jan. 15, 2021, 15 pages.

(Continued)

*Primary Examiner* — Mohamed A Kamara
(74) *Attorney, Agent, or Firm* — XSENSUS LLP

(57) ABSTRACT

A network entity for a mobile telecommunications system, including circuitry configured to perform transmission rate control of data transmissions according to a transmission control protocol, wherein the transmission rate control is performed based on an output of a machine learning algorithm including a prediction of a congestion of the data transmissions.

16 Claims, 7 Drawing Sheets

(51) Int. Cl.
*H04L 41/16* (2022.01)
*H04L 47/127* (2022.01)

(58) Field of Classification Search
CPC ..... H04L 41/147; H04L 41/16; H04L 1/0002; H04W 28/02; H04W 28/22
See application file for complete search history.

(56) References Cited

U.S. PATENT DOCUMENTS

| | | |
|---|---|---|
| 2005/0286416 A1 | 12/2005 | Shimonishi et al. |
| 2009/0154496 A1 | 6/2009 | Fujinami |
| 2010/0309788 A1* | 12/2010 | Ho .................. H04L 47/765 370/236 |
| 2013/0128735 A1 | 5/2013 | Li et al. |
| 2013/0170342 A1 | 7/2013 | Alnuem |
| 2013/0329552 A1 | 12/2013 | Carnero Ros et al. |
| 2017/0164238 A1* | 6/2017 | Paredes Cabrera ... H04W 28/22 |
| 2018/0255117 A1 | 9/2018 | Ljung et al. |
| 2020/0245188 A1* | 7/2020 | Zhang ................ H04W 72/569 |
| 2020/0259740 A1 | 8/2020 | Wetterwald et al. |
| 2021/0099916 A1* | 4/2021 | Dong ................... H04L 5/0055 |
| 2022/0167183 A1 | 5/2022 | Eng et al. |
| 2022/0353022 A1* | 11/2022 | Murayama ........... H04L 1/1861 |

FOREIGN PATENT DOCUMENTS

| | | |
|---|---|---|
| WO | 2008154786 A1 | 12/2008 |
| WO | 2012/131424 A1 | 10/2012 |
| WO | 2019/192361 A1 | 10/2019 |

OTHER PUBLICATIONS

3GPP, "NR; Medium Access Control (MAC) protocol specification (Release 15)", 3GPP TS 38.321 V15.7.0, Sep. 2019, pp. 1-78.

3GPP, "IP Multimedia Subsystem (IMS); Multimedia Telephony; Media handling and interaction (Release 16)", 3GPP TS 26.114 V16.4.0, Dec. 2019, pp. 1-440.

Shojaedin et al., "TCP-Aware Scheduling in LTE Networks", Proceeding of IEEE International Symposium on a World of Wireless, Mobile and Multimedia Networks 2014, Jun. 19, 2014, pp. 1-9.

* cited by examiner

A

B

NETWORK ENTITY AND USER EQUIPMENT FOR TRANSMISSION RATE CONTROL

CROSS-REFERENCE TO RELATED APPLICATIONS

The present application is a continuation of U.S. application Ser. No. 17/785,065 filed Jun. 14, 2022, which is based on PCT filing PCT/EP2021/050833, filed Jan. 15, 2021, which claims priority to EP 20152728.0, filed Jan. 20, 2020, the entire contents of each are incorporated herein by reference.

TECHNICAL FIELD

The present disclosure generally pertains to a network entity and a user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE-A or NR, respectively, it is assumed that specific requirements of the 5G technologies will, basically, be dealt with by features and methods which are already defined in the LTE-A and NR standard documentation.

Additionally, the transmission control protocol ("TCP") is a very common protocol used in the internet and many applications supported in 5G networks will continue to use the transmission control protocol.

It is known that the rate of data transmissions entering a network according to the transmission control protocol is controlled by several mechanisms, such as the slow-start mechanism. In the slow-start mechanism the transmission rate may be decreased significantly after a network congestion has been detected and may only start to increase slowly afterwards, which is may be recognized by users, for example, in the case of highly user centric wireless services, such as virtual reality, in which the gap between the end user and the network functions is almost minimal.

Although there exist techniques for transmission rate control of data transmissions according to a transmission control protocol, it is generally desirable to improve the existing techniques.

SUMMARY

According to a first aspect the disclosure provides a network entity for a mobile telecommunications system, comprising circuitry configured to perform transmission rate control of data transmissions according to a transmission control protocol, wherein the transmission rate control is performed based on an output of a machine learning algorithm including a prediction of a congestion of the data transmissions.

According to a second aspect the disclosure provides a user equipment for a mobile telecommunications system, comprising circuitry configured to use a service based on a transmission control protocol and to receive from a network entity a first MAC control element including a recommended bitrate which is based on an output of a machine learning algorithm including a prediction of a congestion of data transmissions according to a transmission control protocol and to adjust the transmission rate of the data transmissions according to the transmission control protocol in response to and based on the received first MAC control element.

According to a third aspect the disclosure provides a user equipment for a mobile telecommunications system, comprising circuitry configured to coordinate activity across different layers, thereby a modem included in the user equipment obtains information about a transmission control protocol header.

According to a fourth aspect the disclosure provides a user equipment for a mobile telecommunications system, comprising circuitry configured to transmit a buffer status report to a network entity indicating a smaller buffer size than it actually has.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
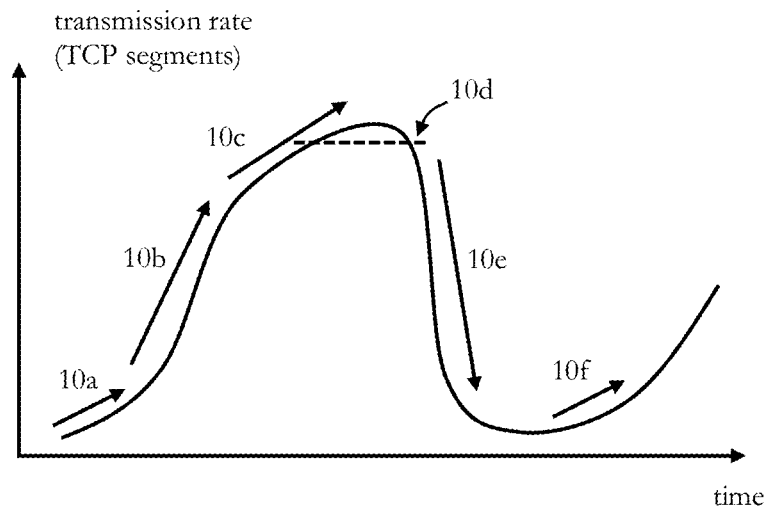
FIG. 2 illustrates in a diagram a slow-start mechanism of a transmission rate of data transmissions according to a transmission control protocol.

Before a detailed description of the embodiments under reference of FIG. 2 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice this year.

One of the candidates for meeting the 5G requirements are termed New Radio ("NR") Access Technology Systems. Some aspects of NR can be based on LTE technology, in some embodiments, just as some aspects of LTE were based on previous generations of mobile communications technology.

Figure 1:
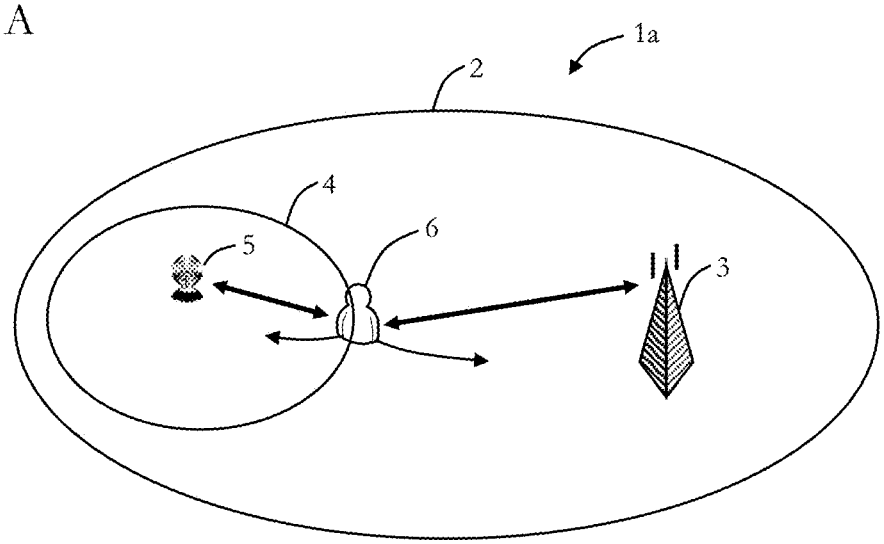
FIG. 1 illustrates schematically two embodiments of a radio access network.
Figure 1:
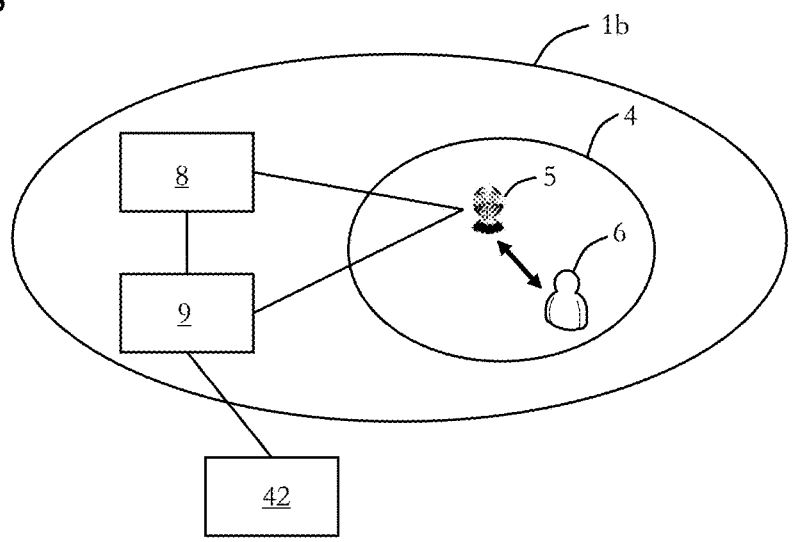

A typical embodiment of an NR radio access network RAN 1a, as an example of a mobile telecommunications system, is illustrated in FIG. 1A. The RAN 1a has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB 5. This embodiment shows an NR EN-DC ("E-UTRA-NR Dual Connectivity") deployment of the telecommunications system 1a.

In some embodiments, the mobile telecommunications system is a NR standalone. Generally, a data collection at different nodes is known and a NWDAF ("Network Data Analytics Function") entity is known. In some embodiments, the NWDAF entity may collect data from e.g. 5G core network, 5G RAN and UE measurements collected at RAN. Further, in some embodiments, there is a provision that data can be collected from an entity outside the 3GPP system, i.e. an application server may share data with the NWDAF entity. In some embodiments, these provisions are present in the network.

Thus, another typical embodiment of an NR radio access network RAN in a mobile telecommunications system 1b is illustrated in FIG. 1B. The RAN has an NR cell 4, which is established by an NR eNodeB 5 (gNB).

A UE 6 can communicate with the gNB 5, which is connected to a 5G core network ("5GC") 8. A NWDAF entity 9 collects data from the 5GC 8, the gNB 5 and an application server 42 outside the mobile telecommunications system 1b.

As mentioned in the outset, the transmission control protocol ("TCP") is a very common protocol used in the internet and many applications supported in 5G networks will continue to use the transmission control protocol. The rate of data transmissions entering a network according to the transmission control protocol is controlled by several mechanisms such as e.g. the slow-start mechanism.

In some embodiments, the TCP window is configured in the transmitter and the receiver and has a sliding window. If the network is congested, the TCP window should be small and if the network is error free and a large bandwidth can be allocated, typically, the TCP window should be large. Other protocols such as packet data convergence protocol ("PDCP") or radio link control ("RLC") window operation may be aligned with the TCP window configuration. Both TCP and RLC support a sliding window mechanism. However, radio conditions may change dynamically and can cause a buffer to overflow leading to TCP slow-start mechanism. This may be recognized by the users, which, as mentioned in the outset, may be inconvenient for highly user centric wireless services, such as virtual reality, in which the gap between the end user and the network functions is almost minimal.

One approach to address this issue, described in a paper ("TCP-Aware Scheduling in LTE Networks", Shojaedin et al.), is that frequent resources are allocated to user equipments ("UE") with a small buffer size. However, it has been recognized that this approach may lead to a resource waste due to inappropriate size of resource allocation or allocated resources not being used at the expense of resource scarcity for UEs with larger buffer sizes.

Furthermore, it has been recognized that artificial intelligence ("AI") and/or machine learning ("ML") is a powerful tool to learn, analyze and predict complex network scenarios, and, thus, machine learning is integrated with wireless communications in some embodiments. The application of ML and/or AI in wireless communications, i.e. mobile telecommunications system, is categorized as follows in some embodiments:

First, an application of ML in a wireless system is to exploit intelligent and predictive data analytics to enhance situational awareness and the overall network operations, such as fault monitoring, user tracking, or the like across the wireless network.

Second, beyond its powerful, intelligent and predictive data analytics functions, ML is used as a major driver of intelligent and data-driven wireless network optimization in order to address a variety of problems ranging from cell association and radio access technology selection to frequency allocation, spectrum management, power control, intelligent beamforming and the like.

Third, beyond its system level functions, ML plays a key role at the physical layer of a wireless network, such as in coding and modulation design, at both the transmitter and the receiver level within a generic communication system.

Fourth, the rapid deployment of highly user-centric wireless services, such as VR, in which the gap between the end-user and the network functions is almost minimal, ML assists in wireless networks that can track and adapt to the human user behaviour.

It has further been recognized that ML and/or AI methods may be used in a scheduler implementation in some embodiments, for example, in a base station such as a gNB. In some embodiments, the ML and/or AI methods are used in scheduler in a network entity to predict a network congestion and/or radio conditions of a UE.

Moreover, it has been recognized that ML and/or AI techniques may be extended to solve the TCP window stalling problem, in some embodiments, and it may be further extended to quick user datagram protocol internet connections ("QUIC"), if the window size is known to e.g. the gNB or if the scheduler can predict the window size.

Hence, some embodiments pertain to a network entity for a mobile telecommunications system, including circuitry configured to perform transmission rate control of data transmissions according to a transmission control protocol, wherein the transmission rate control is performed based on an output of a machine learning algorithm including a prediction of a congestion of the data transmissions.

The network entity may be a base station, such as an eNodeB, a NR gNB, or the like as a part of the mobile telecommunications system, which may be based on UMTS, LTE, LTE-A, or an NR, 5G system or the like. The entity may also be any other entity of a mobile telecommunications system and may be located anywhere in the system.

The circuitry may include at least one of: a processor, a microprocessor, a dedicated circuit, a memory, a storage, a radio interface, a wireless interface, a network interface, or the like, e.g. typical electronic components which are included in a base station, such as an eNodeB, NR gNB, a user equipment, or the like. It may include an interface, such as a mobile telecommunications system interface which is adapted to provide communication to and/or from the mobile telecommunications system. It may also include a wireless interface, e.g. a wireless local area network interface, a Bluetooth interface, etc.

As generally known, data transmissions according to the transmission control protocol are packet based transmissions and the transmission rate typically depends on the window size and the round-trip time. In some embodiments, the window size is the maximum number of bytes that the source can send in a set of packets for which it has not received acknowledgments. The destination computer sends back an acknowledgment for every correct packet that it receives. In some embodiments, the round-trip time is the time from the transmission of a packet until the reception of its acknowledgment by the source.

Thus, the transmission rate may be controlled by adjusting the window size, the bitrate in a wireless transmission, or by influencing the round-trip time, which may depend on a quality of a connection, a network congestion, network scheduling, a busy server or base station or the like.

The machine learning algorithm may be or may include or may be based on a neural network, a decision tree, a support vector machine or the like generating an output which is used by a scheduler in the network entity in order to perform the transmission rate control, i.e. to decide if transmission rate control by the network entity is required and take the necessary actions accordingly. The ML algorithm may be trained by supervised, unsupervised, reinforcement, deep learning strategies or the like. The ML algorithm may use historical network data in supervised and deep learning strategies.

The ML algorithm outputs a prediction of congestion of data transmissions according to the transmission control protocol (for example a time when it is likely to occur and/or a probability for the congestion occurring and the like) and provides the output, for example, to a scheduler in the network entity, which decides about controlling the transmission rate. The prediction may be based on learning from TCP congestion mechanism, lower layer protocol configurations, UE radio conditions and the like.

As an example:

Assuming a TCP window size of 8 kB is configured in the transmitter and receiver. Due to congestion and delay, the buffer occupancy at one instance stands at 7 kB and 1 kB of more data may trigger the TCP slow-start mechanism. The scheduler or similar entity in the network entity, for example, a gNB may perform the packet inspection and is aware of the configured TCP window size. Thus, in some embodiments, the circuitry (of the network entity) is further configured to perform transmission control protocol data packet inspection.

This build up of data may be due to either losing packet(s) or slow scheduling:

A packet loss at the TCP layer may also cause a missing ACK at RLC AM sub-layer. The RLC sub-layer may notice it at a slightly different time compared to TCP because TCP ACK and RLC ACK may have different timing (RLC ACK is based on Poll-PDU and Poll-Byte, i.e. number of PDUs and number of bytes before sending ACK) and the network/application may configure same or different values to TCP ACK. Also, the mechanism to configure these parameters is different, i.e. TCP window is configured dynamically with TCP packets whereas RLC parameters are configured by RRC and most likely at the time of bearer setup. The packet may be lost in PDCP sub-layer due to discard timer expiry.

Thus, the scheduler can collate these events and a ML and/or AI models may learn and predict the future possibilities.

If the buffer build up is due to congestion and packets are arriving later, then this may be detected by e.g. PDCP discard timer or UL delay parameter.

Thus, the scheduler can collect these statistics and predict the future actions with certain level of certainty. A scheduler armed with such information may avoid buffer overflow or saturation and either slow down or speed up the packet scheduling.

Consequently, in some embodiments, the transmission rate control is performed by controlling a data scheduling rate. The data scheduling rate can be controlled by the network entity and, thus, controls indirectly the transmission rate of data transmissions according to the transmission control protocol. Since TCP window is configured in the TCP packets itself and RLC window is configured using radio resource control ("RRC"), the cross layer alignment may not work properly, but with ML implemented near network entity scheduler, the ML may learn TCP traffic characteristics and treatment in the network and adjusts scheduling of data transmissions for such services accordingly.

Generally, the TCP end point on the network side is unknown (somewhere in the internet) and another option may be that if, for example, the gNB (network entity) and the UE communicate and act accordingly, i.e. act to control the transmission rate. The straightforward option may be that gNB can communicate to the UE about any possible TCP head-of-line blocking or congestion or avoid triggering of slow-start mechanism.

There is, for example, prior art on a new MAC ("Medium Access Control") control element for informing the UEs about a recommended bit rate. However, it was agreed for a specific use case of MTSI ("Multimedia Telephony Service for IMS") and ANBR ("Access Network Bitrate Recommendation") as specified in 3GPP TS 26.114 and TS 38.321. It is used by RTP/RTCP and sent by the gNB to the UE for both uplink ("UL") and downlink ("DL") recommended data rate. There, the averaging window time is fixed for 2000 msec. This is comparable to the rate control mechanism for audio.

In some embodiments, the above MAC control element (herein: first MAC control element) may be modified to extend the rate control mechanism for TCP based applications in order to exercise the rate control when the TCP window is about to stall. In such embodiments, the averaging window time is configurable, so that it can be adjusted according to different applications and/or radio conditions.

Hence, in some embodiments, the circuitry of the network entity is further configured to generate a first MAC control element including a recommended bitrate and wherein the transmission rate control is performed by transmitting the first MAC control element to a user equipment using a service based on the transmission control protocol, which adjusts in response to and based on the transmitted first MAC control element the transmission rate of the data transmissions according to the transmission control protocol.

In some embodiments, the first MAC control element includes an averaging window time.

The user equipment is configured accordingly, i.e. the user equipment can receive the first MAC control element and adjust the transmission rate accordingly. In response to the received first MAC control element the UE may adjust the TCP window size and/or the transmission bitrate and/or the averaging window time based on the received first MAC control element.

In some embodiments, the recommended bitrate and/or the averaging window time is based on the output of the machine learning algorithm.

In some embodiments, the network entity performs the signaling about congestion and a necessary adaption of transmission rate by the user equipment in order to exercise the transmission rate control when the TCP window is about to stall by other signaling procedures than the first MAC control element. In such embodiments, the signaling is based on RRC signaling, physical layer control signaling (DCI), an allocated grant or the like.

In some embodiments, the circuitry (of the network entity) is further configured to receive a query for the recommended bitrate from the user equipment and to transmit in response to the received query the first MAC control element to the user equipment.

Some further explanations regarding the recommended bitrate are described in 3GPP TS 38.321 (e.g. in section 5.8.10), which may be used/extended/modified for transmission rate control in TCP based applications.

In addition, a new MAC control element (herein: second MAC control element) from a UE to a network entity may be introduced which indicates any data rate preference from UE's TCP layer point of view. The MDT ("Minimization of Drive Tests") framework has introduced the UL PDCP queueing delay per QCI ("Channel Quality Indicator") or 5QI ("5G Quality of Service Indicator") as one of the parameters. It counts for AS delay, i.e. from the packet arriving at PDCP layer to receiving the UL grant+HARQ, RLC delay, F1 delay, PDCP reordering delay. This parameter can provide delay in the AS layer but may not address TCP window stalling issue due to different layers being involved. The new MAC control element may also change RLC or PDCP parameters like Poll-PDU, Poll-Byte or PDCP discard timer.

Hence, in some embodiments, the circuitry is further configured to receive a second MAC control element including a data rate preference from a user equipment using a service based on the transmission control protocol and wherein the transmission rate control is performed further based on the second MAC control element. The second MAC control element provides, for example, further information about UE radio conditions and transmission channel.

In some embodiments, the second MAC control element includes an uplink packet data convergence protocol queueing delay per at least one of channel quality indicator and 5G quality of service indicator.

In some embodiments, the second MAC control element changes at least one of radio link control and packet data convergence protocol parameters.

In some embodiments, the parameters include at least one of Poll-PDU, Poll-Byte and packet data convergence protocol discard timer.

The MAC control elements are examples and actual signalling may take place, in some embodiments, via PDCP control PDU, LI signalling or RLC control PDU. Even though RLC data or PDCP data PDU may also be used for this purpose, these formats may reduce the flexibility as new bits to indicate new format may have backward compatibility issues and the capability to understand new formats may be needed.

As mentioned above, in some embodiments, the output of the machine learning algorithm includes a prediction about congestion of data transmissions according to the TCP. The network entity may realize (detect) that TCP is about to start congestion control (slow-start mechanism) from the ML output and the network (entity) scheduler will prevent from it, for example, by the change of transmission rate.

In some embodiments, the machine algorithm includes a recurrent neural network.

Generally, neural networks are organized into multiple layers, wherein each layer includes one or more nodes and wherein each node in one layer is connected to nodes in an immediately preceding and following layer. The layer that receives external data (input) is the input layer and the layer that produces the results and/or predictions (output) is the output layer. In between is an intermediate layer including one or more hidden layers. Each connection between the nodes is assigned with a weight. A trained neural network may be characterized by the trained weights. In a recurrent neural network ("RNN") the input may be a sequence of data, such as a time series of data, and the recurrent network has an internal state. The nodes in an RNN loop the input data, for example, it uses the output of a first iteration as an input of the second iteration and so on. Thus, it may predict future events based on a time evolution of various input parameters, i.e. it is suitable for the prediction of time series data (for example the timing of a congestion of data transmissions).

In some embodiments, a question is what are key factors of congestion, since these factors should be input to the ML algorithm. Generally, the ML algorithm can find autonomously the relevant input parameters among many ones. In that sense, any type of input may be fine. However, too many parameters may cause additional cost (e.g. a large number of neurons or layers in a neural network, as a result huge processing power is required). Therefore, in some embodiments, it is better to select the relevant input as of the best knowledge of a communication system designer.

The following parameters may be relevant input parameters for the prediction of TCP congestion and output parameters:

Input layer:
Radio conditions:
 Synchronization Signal-reference signal received power (SS-RSRP);
 Channel State Information-reference signal received power (CSI-RSRP);
 Synchronization Signal-reference signal received quality (SS-RSRQ)
 Channel State Information-reference signal received quality (CSI-RSRQ);
 Channel Quality Indicator (CQI);
 Sounding Reference Signal (SRS) measurement; and
 Block error rate
RLC layer:
 The Error or missing ACK at RLC layer.
PDCP layer:
 Expiry of discard timer in PDCP layer.
TCP layer:
 The base station, i.e. network entity, may read application layer data using deep packet inspection, then interpret the contents of TCP header; and
 TCP port number, it could be the clue of application (e.g. ftp download, Web, messaging, video streaming, video conference tool and the like).
Traffic load:
 The historical data of traffic load with time stamp. The network congestion likely to occur in busy hour.
 Layer 2 measurement—UL PDCP queuing delay
Output layer:
 Time/date of restriction start;
 location of restriction start;
 Type of restricted services; and
 UL or DL or both rate control.

Hence, in some embodiments, an output of the recurrent neural network includes at least one of a timing of a connection restriction start, a location of a connection restriction start, a type of a restricted service and a prediction of an uplink transmission rate control, a downlink rate control or both.

In some embodiments, an input of the recurrent neural network includes time series data.

In some embodiments, the time series data includes radio conditions.

In some embodiments, the radio conditions include at least one of a synchronization signal-reference signal received power, a channel state information-reference signal received power, a synchronization signal-reference signal received quality, a channel state information-reference signal received quality, a channel quality indicator, a sounding reference signal measurement and a block error rate.

In some embodiments, the time series data include at least one of an error and a missing ACK at a radio link control layer.

In some embodiments, the time series data include an expiry of discard timer in a packet data convergence protocol layer.

In some embodiments, the time series data include information from a transmission control protocol header.

In some embodiments, the time series data include at least one of a traffic load with time stamp and an uplink packet data convergence queuing delay.

In some embodiments, the recurrent neural network is trained based on historical training data, which may be obtained from historical network data including data for the above-listed input parameters and data about when TCP congestion happened.

In some embodiments, the recurrent neural network is trained offline or during operation.

In some embodiments, the training process is deployed inside a network entity (e.g. base station or the like) as described herein, including electronic components (circuitry) which are typically used for a training process a ML algorithm, i.e. neural network, such as a memory, a microprocessor, a graphical processing unit, or the like. In other embodiments the training process is deployed inside an external server/tool for network operation and maintenance (O&M). In some embodiments, the training process is handled offline. In other embodiments, the training process is handled during live network operation, wherein the server includes enough memory to store the historical (training) data. In some embodiments, the raw data of the network (historical data) is too large to store on a memory inside the network entity or the server. In such embodiments, the data is processed in advance of the training process, for example, by averaging or the like in order to reduce the size.

In some embodiments, the trained ML algorithm, e.g. recurrent neural network having trained weights, is deployed for inference (actual operation for admission control) in the network entity. In such embodiments, the input to the ML algorithm, e.g. the recurrent neural network, is actual (real-time) data from live network monitoring, some static configurations and historical data (which may include live network monitoring data from previous iterations).

Some embodiments pertain to a user equipment for a mobile telecommunications system, including circuitry configured to use a service based on a transmission control protocol and to receive from a network entity a first MAC control element including a recommended bitrate which is based on an output of a machine learning algorithm including a prediction of a congestion of data transmissions according to a transmission control protocol and to adjust the transmission rate of the data transmissions according to the transmission control protocol in response to and based on the received first MAC control element.

The user equipment may be or may include a smartphone, a VR device, a laptop or the like. The circuitry may include at least one of: a processor, a microprocessor, a dedicated circuit, a memory, a storage, a radio interface, a wireless interface, a network interface, or the like, e.g. typical electronic components which are included in a user equipment to achieve the functions as described herein.

In some embodiments, the circuitry (of the user equipment) is further configured to transmit a query for the recommended bitrate to a network entity.

In some embodiments, the circuitry (of the user equipment) is further configured to transmit a second MAC control element to a network entity including a data rate preference.

In some embodiments, the second MAC control element includes an uplink packet data convergence protocol queueing delay per at least one of channel quality indicator and 5G quality of service indicator.

A normal handset (user equipment) may have different processors for modem and application. Thus, it has been recognized that an implementation of a user equipment may coordinate the activities across different layers, i.e. the AS ("Access Stratum") layer in a modem of the user equipment may be aware of the TCP header, which is generated/received in the application layer.

Hence, some embodiments pertain to a user equipment for a mobile telecommunications system, including circuitry configured to coordinate activity across different layers, thereby a modem included in the user equipment obtains information about a transmission control protocol header.

In some embodiments, from a user equipment point of view, the user equipment can send a buffer status report ("BSR"), which indicates a smaller buffer size than it actually has in order to ask for a smaller grant from a network entity, if the user equipment detects congestion of data transmissions. The buffer status report is generally known from LTE.

Hence, some embodiments pertain to a user equipment for a mobile telecommunications system, including circuitry configured to transmit a buffer status report to a network entity indicating a smaller buffer size than it actually has.

As above, the user equipment may be or may include a smartphone, a VR device, a laptop or the like. The circuitry may include at least one of: a processor, a microprocessor, a dedicated circuit, a memory, a storage, a radio interface, a wireless interface, a network interface, or the like, e.g. typical electronic components which are included in a user equipment to achieve the functions as described herein.

In some embodiments, a network entity as described herein and a user equipment as described herein constitute a transmission rate control system for data transmissions according to a transmission control protocol and/or are part of a mobile telecommunications system (network).

Returning to FIG. 2, which illustrates in a diagram a slow-start mechanism of a transmission rate of data transmissions according to a transmission control protocol.

The time evolution of the transmission rate of data transmissions (i.e. TCP segments) according to the transmission control protocol in FIG. 2 shows the typical problematic case (which will be avoided by the techniques as described herein).

At 10a the transmission rate is increased slowly (initial cwnd in TCP) and starts to increase exponentially at 10b up to a certain level. At 10c the transmission rate increases moderately when the congestion window reaches the TCP slow-start threshold (ssthresh in TCP).

However, TCP has no idea when congestion is likely to occur, thus, it continues to increase the transmission rate until maximum allowed rate. At some point congestion occurs and a missing TCP ACK is detected at 10d, which enables the TCP to detect and react on the congestion by rapidly decreasing the transmission rate at 10c. When a low transmission rate is reached the slow-start mechanism starts again at 10f.

Figure 3:
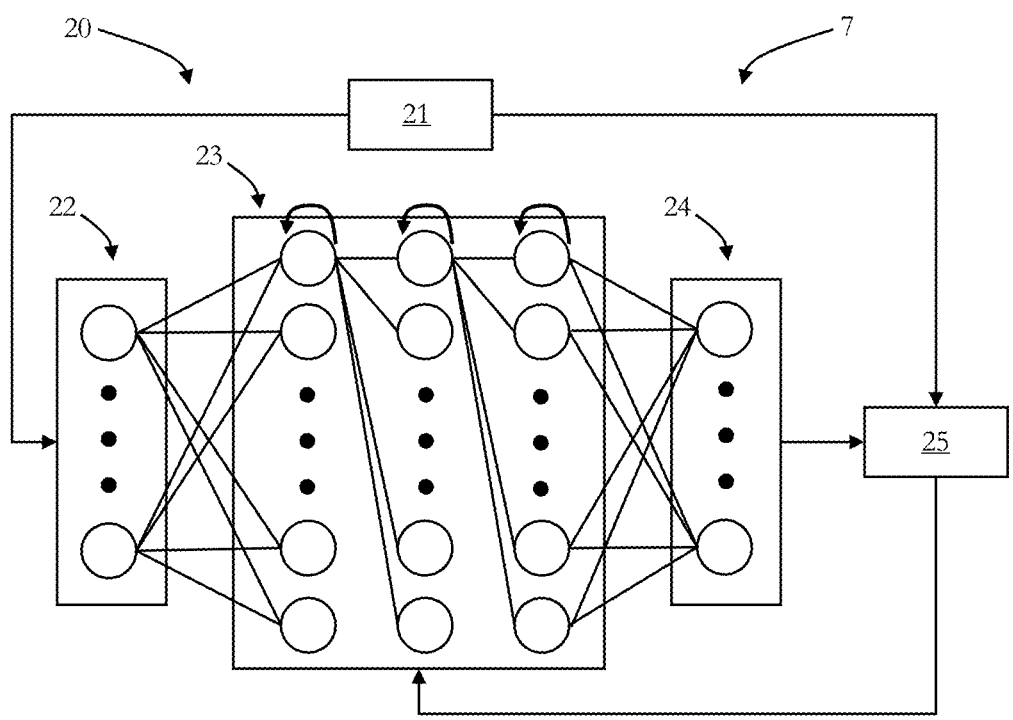
FIG. 3 illustrates in a block diagram an embodiment of a recurrent neural network in a training stage.

This typical time evolution is useful as training data for the machine learning algorithm such as a recurrent neural network shown in FIG. 3 in training stage.

FIG. 3 illustrates in a block diagram an embodiment of a recurrent neural network 20 in a training stage.

In this embodiment, the recurrent neural network 20 (illustrated by the arrow going back on the same node) in the training stage is deployed in the network entity 7 and obtains input from a data storage device including historical data 21 at an input layer 22. In this embodiment, the input includes historical time series data including radio conditions, data/information from RLC, PDCP, TCP layer and traffic load, as described above.

The nodes of the input layer 22 are connected to first nodes of an intermediate layer 23. The intermediate layer 23 performs calculations and the last nodes are connected to an output layer, which outputs a prediction for congestion occurrence (a time when it will occur and/or a probability for the congestion occurring) and other output values, as described herein.

A loss function 25 compares the predicted result with the actual results obtained from the stored historical data 21 and uses a backpropagation algorithm to update the weights of the neural network 20 in order to increase the prediction accuracy of the recurrent neural network 20.

Figure 4:
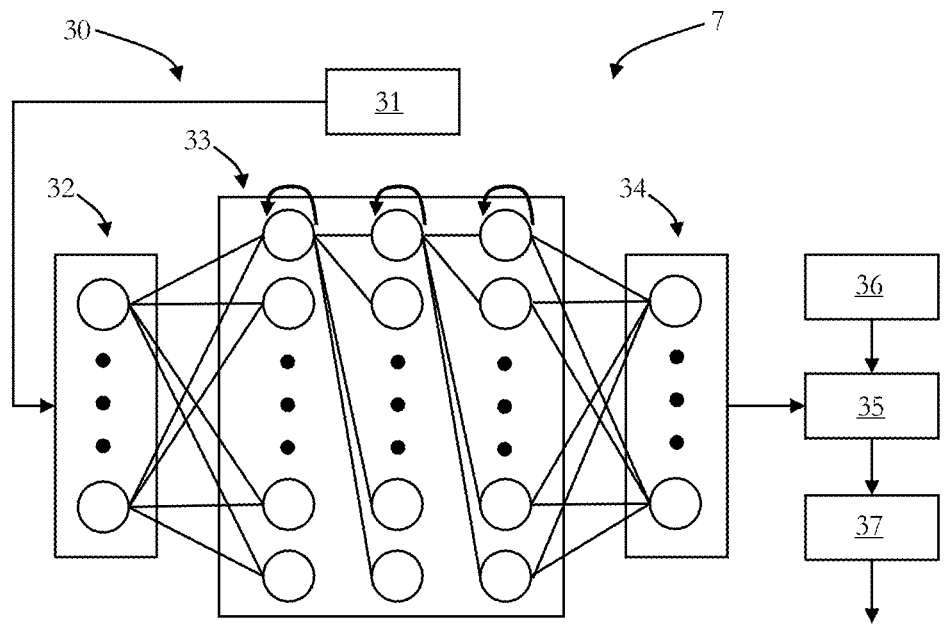
FIG. 4 illustrates in a block diagram an embodiment of a recurrent neural network in an inference stage.

FIG. 4 illustrates in a block diagram an embodiment of a recurrent neural network 30 in an inference stage.

The neural network 30 corresponds to the trained recurrent neural network 20 of FIG. 3 and is deployed in the network entity 7 for inferencing, wherein the input layer 32, the intermediate layer 33 and the output layer 34 have the same structure as in FIG. 3. The recurrent neural network 30 obtains actual (real-time) data 31 from live network and measurement results (input data as described herein) and outputs the predictions about congestion of data transmissions according to a transmission control protocol to a scheduler 35 (which is part of the network entity).

The scheduler 35 schedules the data in a scheduler queue 36 including data transmissions from a user equipment using a TCP based service. Based on the prediction of congestion of the data transmissions from the recurrent neural network 30 the scheduler 35 decides about transmission rate control of the data transmissions in the scheduler queue 36 and determines an action 37 for performing the transmission rate control, which are actions as described herein.

The scheduler 35 can, for example, adjust the data scheduling rate of the data transmissions from a TCP based service in a way that the slow-start mechanism is avoided and a high transmission rate is achieved constantly.

In other embodiments, there are variations of deployment of machine learning function such as input layer 32, the intermediate layer 33 and the output layer 34. A straightforward variation is a deployment inside the network entity (e.g. inside base station), as discussed. In some embodiments, it is high performance processing (e.g. cloud/edge computing) outside the network entity and connected to the network entity via interface (e.g. O&M network). The network virtualization/cloud based RAN could provide an alternative flexible deployment option.

Figure 5:
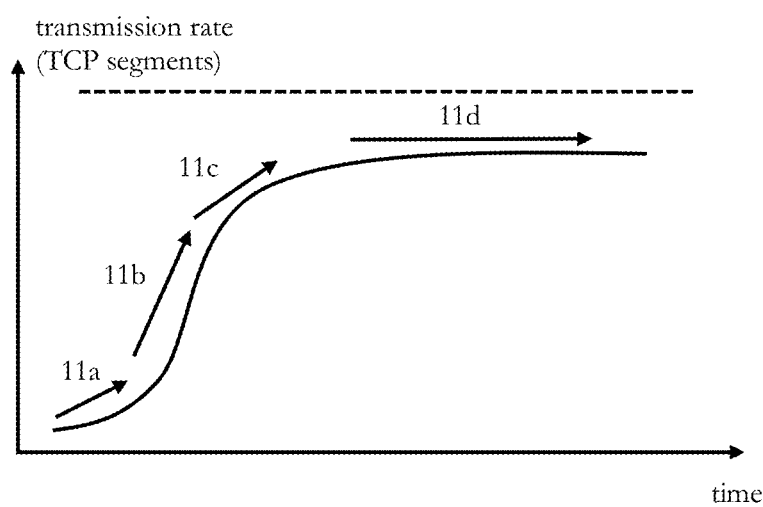
FIG. 5 illustrates in a diagram a time evolution of a transmission rate of data transmissions according to a transmission control protocol which is controlled by a network entity.

FIG. 5 illustrates in a diagram a time evolution of a transmission rate of data transmissions according to a transmission control protocol which is controlled by a network entity 7.

At 11a the transmission rate is increased slowly (initial cwnd in TCP) and starts to increase exponentially at 11b up to a certain level. At 10c the transmission rate increases moderately when the congestion window reaches the TCP slow-start threshold (ssthresh in TCP).

The network entity 7 from FIG. 4 continuously monitors the time evolution of the transmission rate of data transmissions according to the transmission control protocol and other input values (as described herein). Based on the prediction of congestion of the data transmissions from the recurrent neural network 30 the scheduler 35 adjust the data scheduling rate of the data transmissions from a TCP based service in a way that the slow-start mechanism is avoided and a high transmission rate is achieved constantly at 11d.

Figure 6:
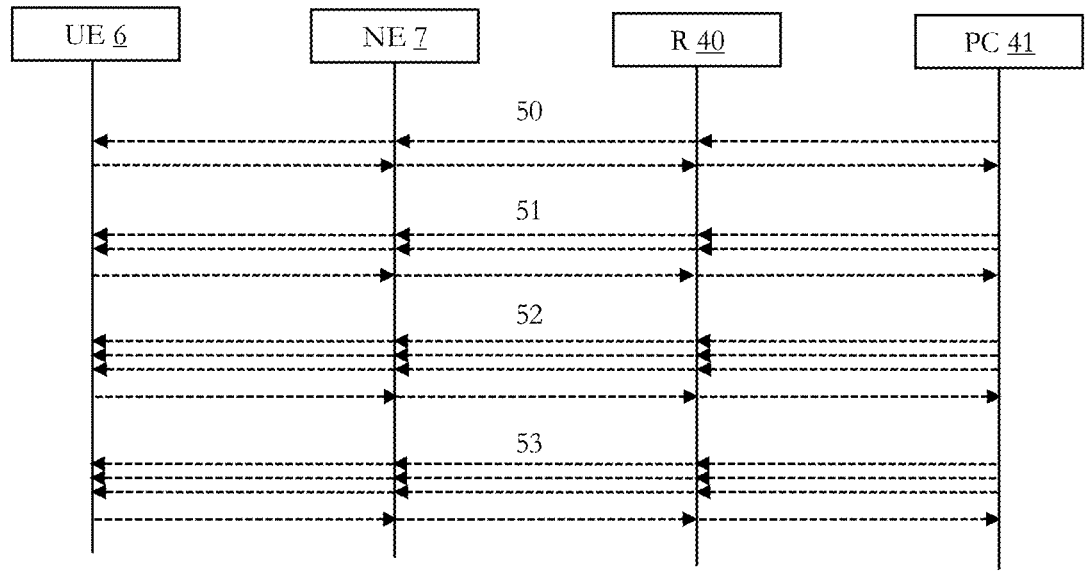
FIG. 6 illustrates in a state diagram a first embodiment of a transmission rate control of data transmissions according to a transmission control protocol by a network entity.

FIG. 6 illustrates in a state diagram a first embodiment of a transmission rate control of data transmissions according to a transmission control protocol by a network entity 7.

The UE 6 has an established TCP connection with a (server) PC 41 and the UE 6 is about to download data from the PC 41. At 50 the PC 41 sends the first data packets at a low transmission rate (as shown in FIG. 5) over the network via a Router R 40 and the network entity NE 7 (which is configured as in FIGS. 4 and 5), which acknowledges its receipt.

At 51, the PC 41 increases the transmission rate (congestion window) which is illustrated by the arrows towards the UE 6. The NE 7 continuously monitors in parallel the network situation (radio conditions, TCP header information, etc. as described herein) in order to decide about transmission rate control of the data transmissions based on the output of the recurrent neural network (machine learning algorithm) including the prediction of congestion of the data transmissions according to the transmission control protocol.

At 52, the PC 41 further increases the transmission rate (congestion window) and the recurrent neural network 30 in the NE 7 predicts that congestion is likely to occur when transmission rate is further increased (for example due to buffer overflow at the router R 40 or decreased radio link conditions or the like as described herein). Based on the output of the machine learning algorithm, the recurrent neural network 30, the NE 7 performs transmission rate control of the data transmissions according to the transmission control protocol by controlling the data scheduling rate.

As a result, the transmission rate is held constant at 53, which is illustrated by the same number of arrows at 52 and 53, which avoids triggering of the TCP slow-start mechanism (as shown in FIG. 5).

Figure 7:
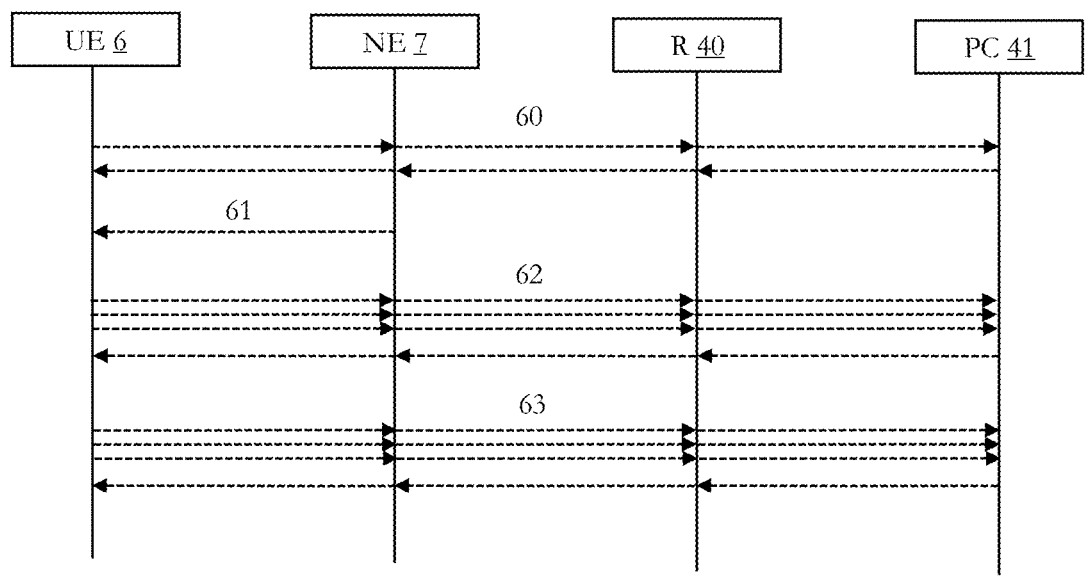
FIG. 7 illustrates in a state diagram a second embodiment of a transmission rate control of data transmissions according to a transmission control protocol by a network entity.

FIG. 7 illustrates in a state diagram a second embodiment of a transmission rate control of data transmissions according to a transmission control protocol by a network entity 7.

The UE 6 has an established TCP connection with a server PC 41 and the UE 6 is about to upload data to the PC 41. At 60 the PC 41 sends the first data packets at a low transmission rate (as shown in FIG. 5) over the network via a Router R 40 and the network entity NE 7 (which is configured as in FIGS. 4 and 5), which acknowledges its receipt.

At 61, the NE 7 generates a first MAC control element including a recommended bitrate and performs a transmission rate control by transmitting the first MAC control element to the UE 6 which uses a service based on the transmission control protocol and the UE 6 adjusts in response to and based on the transmitted first MAC control element the transmission rate of the data transmissions according to the transmission control protocol.

At 62, the data transmissions proceed with the adjusted transmission rate, which is held constant at 63, which is illustrated by the same number of arrows at 62 and 63. Consequently, a triggering of the TCP slow-start mechanism (as shown in FIG. 5) is avoided.

Figure 8:
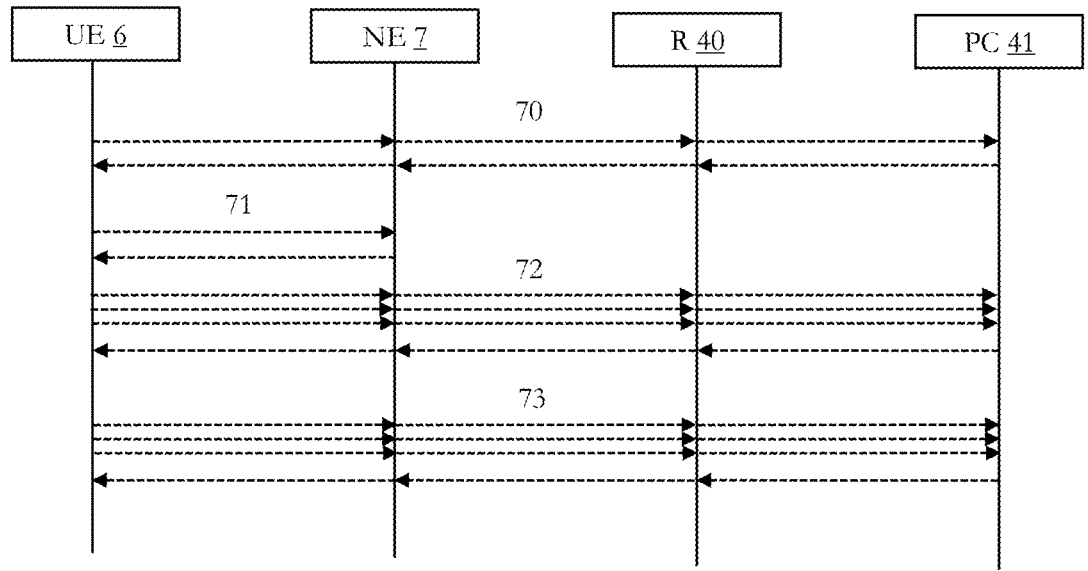
FIG. 8 illustrates in a state diagram a third embodiment of a transmission rate control of data transmissions according to a transmission control protocol by a network entity.

FIG. 8 illustrates in a state diagram a third embodiment of a transmission rate control of data transmissions according to a transmission control protocol by a network entity 7.

The UE 6 has an established TCP connection with a server PC 41 and the UE 6 is about to upload data to the PC 41. At 70 the PC 41 sends the first data packets at a low transmission rate (as shown in FIG. 5) over the network via a Router R 40 and the network entity NE 7 (which is configured as in FIGS. 4 and 5), which acknowledges its receipt.

At 71, the UE 6 transmits a query for the recommended bitrate to the NE 7, which in response to the received query transmits the first MAC control element (from FIG. 7) to the user equipment for performing transmission rate control of data transmissions according to a transmission control protocol.

In another embodiment, the query for the first MAC control element may be transmitted from the UE6 to the NE 7 in a case where there is no response from the network.

In other embodiments, it is likely that congestion is detected at the receiver, for example, in the entity PC 41, so that an NWDAF entity receives an input directly from PC 41, if an NWDAF is deployed.

At 72, the data transmissions proceed with the adjusted transmission rate, which is held constant at 73, which is illustrated by the same number of arrows at 72 and 73. Consequently, a triggering of the TCP slow-start mechanism (as shown in FIG. 5) is avoided.

Figure 9:
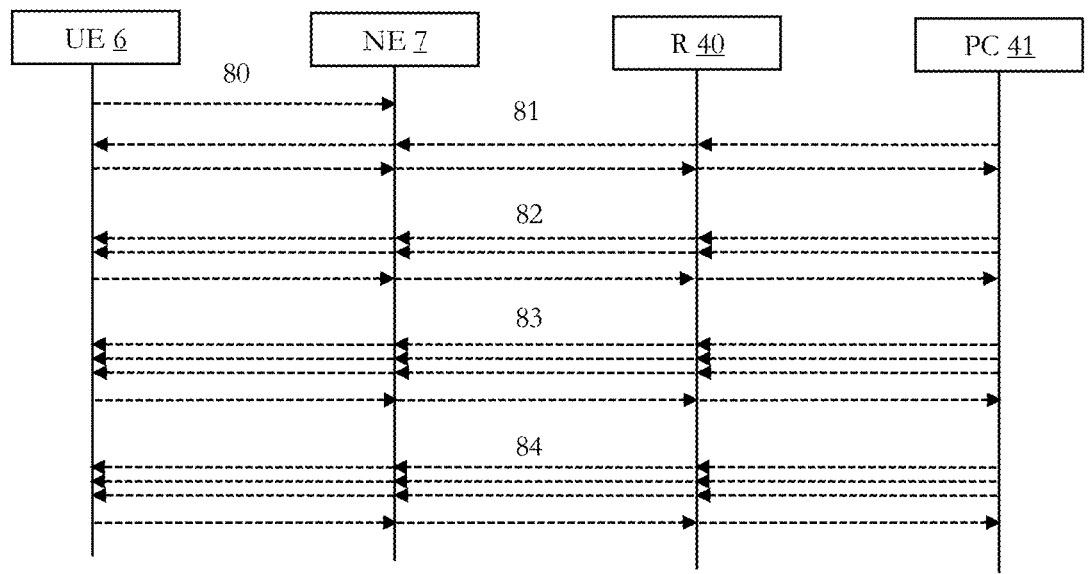
FIG. 9 illustrates in a state diagram a fourth embodiment of a transmission rate control of data transmissions according to a transmission control protocol by a network entity.

FIG. 9 illustrates in a state diagram a fourth embodiment of a transmission rate control of data transmissions according to a transmission control protocol by a network entity 7.

The embodiment is basically the same as the embodiment of FIG. 6 except for that the UE 6, which uses a service based on the transmission control protocol, transmits, at 80, a second MAC control element including a data rate preference to the NE 7, which performs the transmission rate control further based on the second MAC control element.

The steps 81 to 84 correspond to the steps 50 to 53 of FIG. 6 except for that the transmission rate control, here by controlling the data scheduling rate in the NE 7, is based on the output of the machine learning algorithm (recurrent neural network 30) and the second MAC control element.

Figure 10:
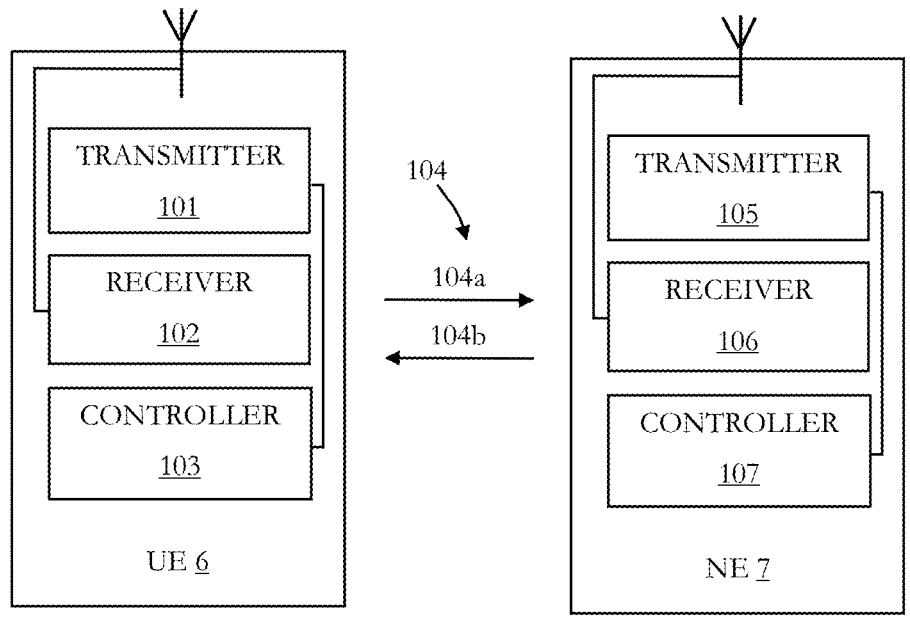
FIG. 10 illustrates in a block diagram a user equipment and a network entity.

An embodiment of a UE 6 and a network entity (NE) 7 (e.g. NR eNB/gNB) and a communication path 104 between the UE 6 and the NE 7, which are used for implementing embodiments of the present disclosure, is discussed under reference of FIG. 10.

The UE 6 has a transmitter 101, a receiver 102 and a controller 103, wherein, generally, the technical functionality of the transmitter 101, the receiver 102 and the controller 103 are known to the skilled person, and, thus, a more detailed description of them is omitted.

The NE 7 has a transmitter 105, a receiver 106 and a controller 107, wherein also here, generally, the functionality of the transmitter 105, the receiver 106 and the controller 107 are known to the skilled person, and, thus, a more detailed description of them is omitted.

The communication path 104 has an uplink path 104a, which is from the UE 6 to the NE 7, and a downlink path 104b, which is from the NE 7 to the UE 6.

During operation, the controller 103 of the UE 6 controls the reception of downlink signals over the downlink path 104b at the receiver 102 and the controller 103 controls the transmission of uplink signals over the uplink path 104a via the transmitter 101.

Similarly, during operation, the controller 107 of the NE 7 controls the transmission of downlink signals over the downlink path 104b over the transmitter 105 and the controller 107 controls the reception of uplink signals over the uplink path 104a at the receiver 106.

Figure 11:
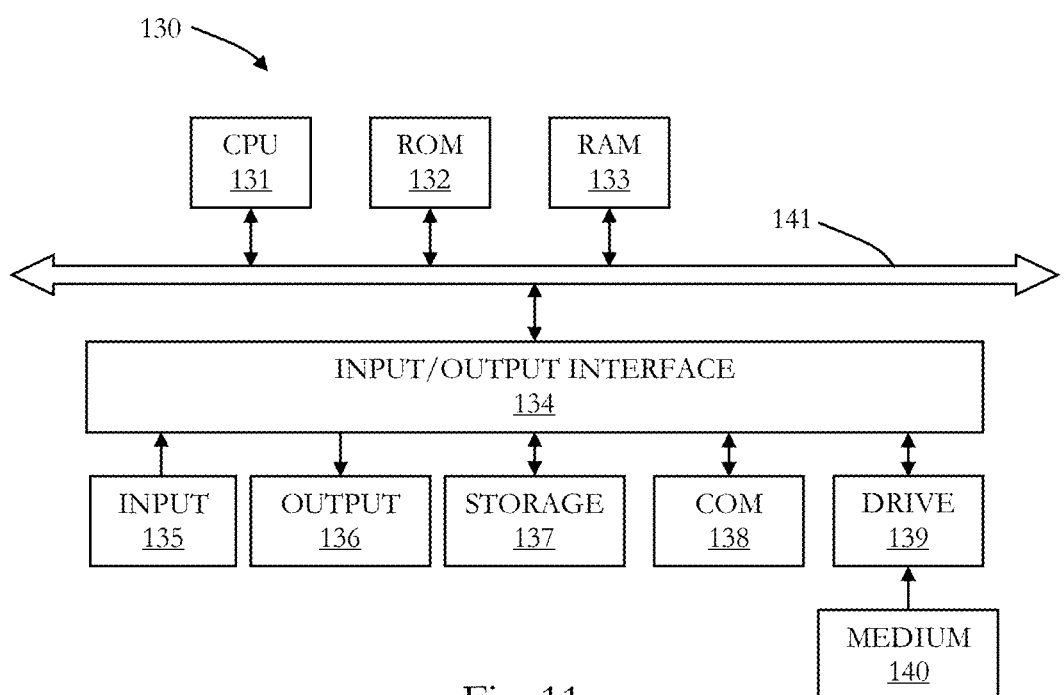
FIG. 11 illustrates in a block diagram a multi-purpose computer which can be used for implementing a user equipment or a network entity.

In the following, an embodiment of a general purpose computer 130 is described under reference of FIG. 11.

The computer 130 can be implemented such that it can basically function as any type of network entity, base station or new radio base station, transmission and reception point, or user equipment as described herein. The computer has components 131 to 141, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The computer 130 is also implemented to transmit data in accordance with TCP. Moreover, the computer 130 may have one or more antennas and/or an antenna array. The present disclosure is not limited to any particularities of such protocols.

Figure 12:
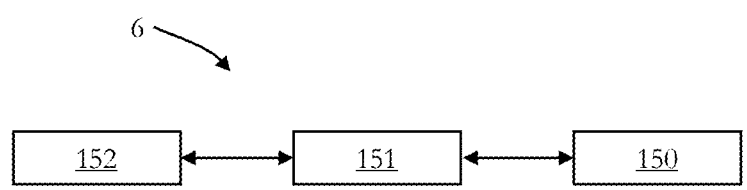
FIG. 12 illustrates in a block diagram an embodiment of a user equipment.

FIG. 12 illustrates in a block diagram an embodiment of a user equipment 6.

The UE 6 includes an application processor 150, a circuitry 151 and a modem 152. In the application processor, i.e. in the application layer, for example, TCP data transmission are generated. The circuitry coordinates the activity across different layers, thereby the modem 152 obtains information about the TCP header.

The circuitry is shown as separate entity only for illustration purposes and may also be integrated in the application processor 150 or the modem 152.

Figure 13:
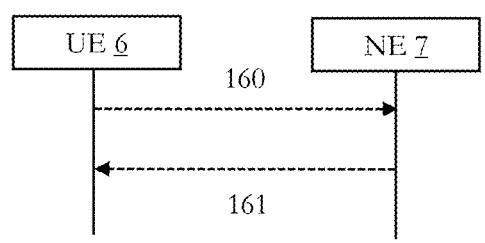
FIG. 13 illustrates in a state diagram a transmission of a buffer status report from a user equipment to a network entity.

FIG. 13 illustrates in a state diagram a transmission of a buffer status report from a user equipment 6 to a network entity 7.

The UE 6 is connected to a mobile telecommunications system and communicates via the NE 7.

At 160, the UE 6 transmits a buffer status report to a network entity indicating a smaller buffer size than it actually has in order to ask for a smaller grant from the NE 7.

At 161, the NE 7 transmits a new grant to UE 6 including transmission parameters the UE 6 should use based on the buffer status report received from UE 6.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A network entity for a mobile telecommunications system, comprising circuitry configured to perform transmission rate control of data transmissions according to a transmission control protocol, wherein the transmission rate control is performed based on an output of a machine learning algorithm including a prediction of a congestion of the data transmissions.

(2) The network entity of (1), wherein the transmission rate control is performed by controlling a data scheduling rate.

(3) The network entity of (1) or (2), wherein the circuitry is further configured to generate a first MAC control element including a recommended bitrate and wherein the transmission rate control is performed by transmitting the first MAC control element to a user equipment using a service based on the transmission control protocol, which adjusts in response to and based on the transmitted first MAC control element the transmission rate of the data transmissions according to the transmission control protocol.

(4) The network entity of (3), wherein the recommended bitrate is based on the output of the machine learning algorithm.

(5) The network entity of (3) or (4), wherein the first MAC control element includes an averaging window time.

(6) The network entity of (5), wherein the averaging window time is based on the output of the machine learning algorithm.

(7) The network entity of anyone of (3) to (6), wherein the circuitry is further configured to receive a query for the recommended bitrate from the user equipment and to transmit in response to the received query the first MAC control element to the user equipment.

(8) The network entity of anyone of (1) to (7), wherein the circuitry is further configured to receive a second MAC control element including a data rate preference from a user equipment using a service based on the transmission control protocol and wherein the transmission rate control is performed further based on the second MAC control element.

(9) The network entity of (8), wherein the second MAC control element includes an uplink packet data convergence protocol queueing delay per at least one of channel quality indicator and 5G quality of service indicator.

(10) The network entity of (8) or (9), wherein the second MAC control element changes at least one of radio link control and packet data convergence protocol parameters.

(11) The network entity of (10), wherein the parameters include at least one of Poll-PDU, Poll-Byte and packet data convergence protocol discard timer.

(12) The network entity of anyone of (1) to (11), wherein the circuitry is further configured to perform transmission control protocol data packet inspection.

(13) The network entity of (12), wherein the machine algorithm includes a recurrent neural network.

(14) The network entity of (13), wherein an output of the recurrent neural network includes at least one of a timing of a connection restriction start, a location of a connection restriction start, a type of a restricted service and a prediction of an uplink transmission rate control, a downlink rate control or both.

(15) The network entity of (13) or (14), wherein an input of the recurrent neural network includes time series data.

(16) The network entity of (15), wherein the time series data includes radio conditions.

(17) The network entity of (16), wherein the radio conditions include at least one of a synchronization signal-reference signal received power, a channel state information-reference signal received power, a synchronization signal-reference signal received quality, a channel state information-reference signal received quality, a channel quality indicator, a sounding reference signal measurement and/or a block error rate.

(18) The network entity of anyone of (15) to (17), wherein the time series data include at least one of an error and a missing ACK at a radio link control layer.

(19) The network entity of anyone of (15) to (18), wherein the time series data include an expiry of discard timer in a packet data convergence protocol layer.

(20) The network entity of anyone of (15) to (19), wherein the time series data include information from a transmission control protocol header.

(21) The network entity of anyone of (15) to (20), wherein the time series data include at least one of a traffic load with time stamp and an uplink packet data convergence queuing delay.

(22) The network entity of anyone of (13) to (21), wherein the recurrent neural network is trained based on historical training data.

(23) The network entity of anyone of (13) to (22), wherein the recurrent neural network is trained offline or during operation.

(24) A user equipment for a mobile telecommunications system, comprising circuitry configured to use a service based on a transmission control protocol and to receive from a network entity a first MAC control element including a recommended bitrate which is based on an output of a machine learning algorithm including a prediction of a congestion of data transmissions according to a transmission control protocol and to adjust the transmission rate of the data transmissions according to the transmission control protocol in response to and based on the received first MAC control element.

(25) The user equipment of (24), wherein the circuitry is further configured to transmit a query for the recommended bitrate to the network entity.

(26) The user equipment of (24), wherein the circuitry is further configured to transmit a second MAC control element to the network entity including a data rate preference.

(27) The user equipment of (26), wherein the second MAC control element includes an uplink packet data convergence protocol queueing delay per at least one of channel quality indicator and 5G quality of service indicator.

(28) A user equipment for a mobile telecommunications system, comprising circuitry configured to coordinate activity across different layers, thereby a modem included in the user equipment obtains information about a transmission control protocol header.

(29) A user equipment for a mobile telecommunications system, comprising circuitry configured to transmit a buffer status report to a network entity indicating a smaller buffer size than it actually has.

The invention claimed is:

1. A network entity for a mobile telecommunications system, comprising:
 circuitry configured to
 receive a first media access control (MAC) control element including an uplink packet data convergence protocol queueing delay per at least one of channel quality indicator and 5G quality of service indicator; and
 perform transmission rate control of data transmissions, wherein the transmission rate control is performed based on the first MAC control element and an output of a machine learning algorithm including a prediction of a congestion of the data transmissions.

2. The network entity of claim 1, wherein
 the transmission rate control is performed by controlling a data scheduling rate.

3. The network entity of claim 1, wherein
 the circuitry is configured to generate a second MAC control element including a recommended bitrate, and
 the transmission rate control is performed by transmitting the second MAC control element to the user equipment using the service.

4. The network entity of claim 3, wherein
 the recommended bitrate is based on the output of the machine learning algorithm.

5. The network entity of claim 3, wherein
 the second MAC control element includes an averaging window time.

6. The network entity of claim 5, wherein
 the averaging window time is based on the output of the machine learning algorithm.

7. The network entity of claim 3, wherein the circuitry is configured to:
 receive a query for the recommended bitrate from the user equipment; and
 transmit, in response to the received query, the second MAC control element to the user equipment.

8. The network entity of claim 1, wherein
 the first MAC control element changes at least one of radio link control and packet data convergence protocol parameters.

9. The network entity of claim 8, wherein
 the parameters include at least one of Poll-PDU, Poll-Byte and packet data convergence protocol discard timer.

10. The network entity of claim 1, wherein
 the circuitry is configured to perform data packet inspection.

11. The network entity of claim 10, wherein
 the machine algorithm includes a recurrent neural network.

12. The network entity of claim 11, wherein
 an output of the recurrent neural network includes at least one of a timing of a connection restriction start, a location of a connection restriction start, a type of a restricted service and a prediction of an uplink transmission rate control, a downlink rate control or both.

13. The network entity of claim 11, wherein
an input of the recurrent neural network includes time series data.

14. A user equipment for a mobile telecommunications system, comprising:
circuitry configured to
use a service based on a protocol;
transmit, to a network entity, a first media access control (MAC) control element including an uplink packet data convergence protocol queueing delay per at least one of channel quality indicator and 5G quality of service indicator; and
receive from the network entity a second MAC control element including a recommended bitrate which is based on the first MAC control element and an output of a machine learning algorithm including a prediction of a congestion of data transmissions; and
adjust the transmission rate of the data transmissions in response to the received second MAC control element.

15. The user equipment of claim 14, wherein
the circuitry is configured to transmit a query for the recommended bitrate to the network entity.

16. The user equipment of claim 14, wherein
the circuitry is configured to transmit a second MAC control element to the network entity including a data rate preference.

* * * * *